(12) United States Patent
Brunet et al.

(10) Patent No.: US 12,355,497 B2
(45) Date of Patent: Jul. 8, 2025

(54) RECEIVING DEVICE FOR ACOUSTIC WAVES

(71) Applicant: THALES, Courbevoie (FR)

(72) Inventors: Jean-Philippe Brunet, Brest (FR); Hervé Derriennic, Brest (FR); Jean-Eric Torlay, Brest (FR)

(73) Assignee: THALES, Courbevoie (FR)

( * ) Notice: Subject to any disclaimer, the term of this patent is extended or adjusted under 35 U.S.C. 154(b) by 153 days.

(21) Appl. No.: 18/034,034

(22) PCT Filed: Aug. 30, 2021

(86) PCT No.: PCT/EP2021/073829
§ 371 (c)(1),
(2) Date: Apr. 26, 2023

(87) PCT Pub. No.: WO2022/096173
PCT Pub. Date: May 12, 2022

(65) Prior Publication Data
US 2023/0403083 A1    Dec. 14, 2023

(30) Foreign Application Priority Data

Nov. 5, 2020    (FR) ........................................ 2011345

(51) Int. Cl.
*H04B 11/00*  (2006.01)
*G01V 1/18*   (2006.01)
*G01V 1/20*   (2006.01)

(52) U.S. Cl.
CPC ............. *H04B 11/00* (2013.01); *G01V 1/187* (2013.01); *G01V 1/201* (2013.01)

(58) Field of Classification Search
None
See application file for complete search history.

(56) References Cited

U.S. PATENT DOCUMENTS

| 3,750,125 | A | * | 7/1973 | Ross | ....................... | G01V 3/105 |
| | | | | | | 340/933 |
| 3,868,624 | A | | 2/1975 | Whitehouse et al. | | |

(Continued)

FOREIGN PATENT DOCUMENTS

FR    2728425 A1 *    6/1996    ........... B06B 1/0618

*Primary Examiner* — Isam A Alsomiri
*Assistant Examiner* — Jonathan D Armstrong
(74) *Attorney, Agent, or Firm* — BakerHostetler

(57) ABSTRACT

A device for receiving acoustic waves, includes an acoustic antenna able to function as a condenser microphone distributed along a line of the acoustic antenna comprising a conductor and a dielectric, the line being a transmission line or being configured to function as a transmission line when the dielectric makes direct physical contact with another conductor, an exciter configured to apply, in a receiving step, an input voltage to a first longitudinal end of the line so as to generate an input electromagnetic wave that moves toward a second longitudinal end of the line and so as to generate an output electromagnetic wave that moves in the opposite direction to the input electromagnetic wave, the input voltage simultaneously comprising a set of sinusoidal voltages comprising a fundamental sinusoidal voltage and a set of harmonics of the fundamental sinusoidal voltage, the frequency of the fundamental sinusoidal voltage being defined so that stationary waves are established in the line such that the output electromagnetic wave comprises directional acoustic-antenna channels.

8 Claims, 3 Drawing Sheets

(56) References Cited

U.S. PATENT DOCUMENTS

| | | | | |
|---|---|---|---|---|
| 5,446,446 A * | 8/1995 | Harman | ............ | G08B 13/2497 |
| | | | | 340/566 |
| 5,448,222 A * | 9/1995 | Harman | ............... | G08B 13/169 |
| | | | | 340/566 |
| 5,555,221 A * | 9/1996 | Brochard | ............... | G01V 1/201 |
| | | | | 367/172 |
| 5,902,430 A * | 5/1999 | Carpenter | ............. | G01V 1/201 |
| | | | | 156/190 |
| 7,120,563 B2 * | 10/2006 | Bechhoefer | ............ | G01R 31/11 |
| | | | | 324/533 |
| 7,228,900 B2 * | 6/2007 | Schultz | .................. | E21B 47/13 |
| | | | | 166/227 |
| 2019/0331942 A1 * | 10/2019 | Eyal | ........................ | G02F 1/125 |

* cited by examiner

RECEIVING DEVICE FOR ACOUSTIC WAVES

CROSS-REFERENCE TO RELATED APPLICATIONS

This application is a National Stage of International patent application PCT/EP2021/073829, filed on Aug. 30, 2021, which claims priority to foreign French patent application No. FR 2011345, filed on Nov. 5, 2020, the disclosures of which are incorporated by reference in their entirety.

FIELD OF THE INVENTION

The field of the invention is that of reception of acoustic waves.

The invention relates, in particular, to the field of electroacoustic receive antennas for receiving acoustic waves with a view to measuring acoustic signals transmitted through water in order, for example, to carry out exploration for oil and gas, to detect mines or to engage in anti-submarine warfare by detecting and locating underwater targets based on measurements delivered by such antennas. These antennas, which are also called towed arrays, generally have an outer shape similar to that of a pipe and may reach several kilometers in length. Towed arrays conventionally comprise, distributed inside and along an elongate sheath capable of being laid out linearly, electroacoustic transducers, piezoelectric transducers for example, that are used to record the acoustic waves caused by sources of underwater noise.

BACKGROUND

Such arrays are intended to be towed by a towing vessel, directly or via a tow cable.

The signals output by the electroacoustic transducers are directed back on board the towing vessel.

A passive sonar comprising such a receive antenna further comprises a power source that allows the power intended to supply the electroacoustic transducers to be generated and a processing unit that is intended to process the measurements delivered by the various electroacoustic transducers with a view to detecting, and then possibly identifying and locating, objects. The power source and the processing unit are located remotely on board the towing vessel.

However, this solution has the drawback that energy-intensive processing is required to form the acoustic channels necessary for locating underwater targets. Moreover, this solution requires a lot of hardware (piezoelectric transducers, electric power lines, multiplexers for measurement transmission) and as a result manufacturing and maintenance involves complex and time-consuming assembly operations.

A device for mapping acoustic fields is known from U.S. Pat. No. 3,868,624. This solution comprises a condenser microphone distributed along an elongate line sensitive to acoustic pressure and control means that are configured to apply electromagnetic pulses in the form of Dirac pulses to the distributed condenser microphone so that the microphone amplitude modulates these electromagnetic pulses depending on the acoustic pressure to which it is subjected. This solution comprises means for receiving amplitude-modulated electromagnetic pulses.

One drawback of this solution is that it has a limited sensitivity. It is therefore suitable for mapping a powerful acoustic field, in the vicinity of an acoustic antenna for example, but is not suitable for application to anti-submarine warfare in which the sought acoustic signals are generally of low power. Specifically, the region of the microphone that is rendered sensitive to pressure under the effect of each pulse, and therefore the useful length of the distributed condenser microphone, has a very short length with respect to the length of the elongate line. For example, a 2 ns pulse excites a region of the line having a length of about 40 cm. As a result of this short useful length, the distributed condenser microphone has a low sensitivity. In this example, if the line measures 400 m, only one thousandth of its length is sensitive at any given time, and only $1/10000$ if it measures 4 km. Marginally, it further makes the microphone sensitive to flow noise, which is located and therefore perturbs the acoustic measurements delivered by the microphone, this limiting the maximum speed of use of the acoustic antenna. Moreover, this solution complicates the formation of directive channels, this making it difficult to use to locate underwater targets.

SUMMARY OF THE INVENTION

One aim of the invention is to limit all or some of the aforementioned drawbacks.

To this end, the subject of the invention is a device for receiving acoustic waves, comprising:
  an acoustic antenna able to function as a condenser microphone distributed along a line of the acoustic antenna comprising a conductor and a dielectric, the line being a transmission line or being configured to function as a transmission line when the dielectric makes direct physical contact with another conductor,
  an exciter configured to apply, in a receiving step, an input voltage to a first longitudinal end of the line so as to generate an input electromagnetic wave that moves toward a second longitudinal end of the line and so as to generate an output electromagnetic wave that moves in the opposite direction to the input electromagnetic wave, the input voltage simultaneously comprising a set of sinusoidal voltages comprising a fundamental sinusoidal voltage and a set of harmonics of the fundamental sinusoidal voltage, the frequency of the fundamental sinusoidal voltage being defined so that stationary waves are established in the line such that the output electromagnetic wave comprises directional acoustic-antenna channels.

Advantageously, the device for receiving acoustic waves comprises a receiver allowing the directional acoustic-antenna channels to be separated and a set of demodulators allowing the directional antenna channels to be amplitude demodulated.

In one particular embodiment, the line is a transmission line.

In this embodiment, the acoustic antenna is, for example, the line, the line being able to function as a condenser microphone over the whole of its length.

In another embodiment, the acoustic antenna comprises the line and elementary condenser microphones that are spaced apart along the line and electrically connected to the line so that the antenna is able to function as a condenser microphone in longitudinal segments that are spaced apart from one another along the line.

Advantageously, the device for receiving acoustic waves comprises a duplexer configured to separate the output electromagnetic wave from the input electromagnetic wave.

The invention also relates to a method for detecting acoustic waves using a device for receiving acoustic waves according to the invention, the detecting method comprising a receiving step in which the exciter applies, to the first longitudinal end of the transmission line, the input voltage.

Advantageously, the method further comprises the following steps: separating the output electromagnetic wave from the input electromagnetic wave, separating the directional acoustic-antenna channels and amplitude demodulating the directional channels.

BRIEF DESCRIPTION OF THE DRAWINGS

Other features, details and advantages of the invention will become apparent upon reading the description given with reference to the appended drawing, which is given by way of example and in which.

In all the figures, the elements that are the same have been identified by the same references.

DETAILED DESCRIPTION

In the present patent application, by conductor what is meant is an electrical conductor and by insulator what is meant is an electrical insulator.

The invention relates to a device for receiving acoustic waves comprising an acoustic receive antenna intended to receive acoustic waves and to measure acoustic pressures.

The invention relates, in particular, to an acoustic antenna intended to receive acoustic waves when it is submerged.

The invention also relates to a terrestrial acoustic antenna allowing acoustic signals transmitted by the ground to be recorded.

Figure 1:
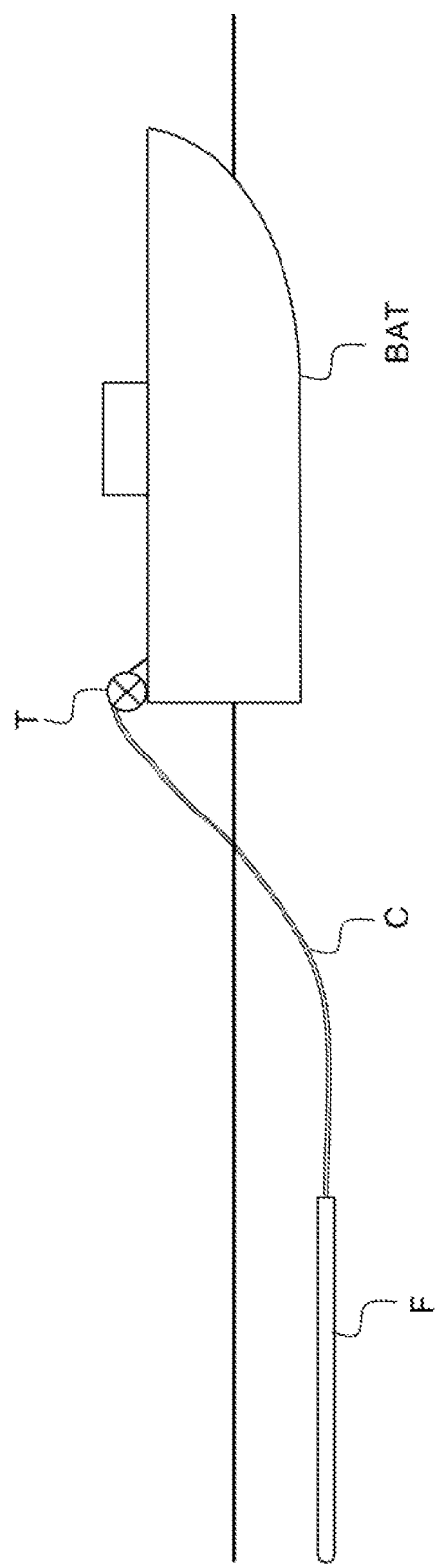
FIG. 1 schematically shows a towed array being towed by a towing vessel by means of a tow cable, FIG. 2 schematically shows the elements of an acoustic device comprising an antenna according to a first embodiment of the invention.

FIG. 1 shows a towed array F, which comprises an acoustic antenna, towed by a towing vessel BAT by means of a tow cable C that may be laid out or wound up by means of a winch T. As a variant, the towed array F may be towed directly by the towing vessel BAT.

Figure 2:
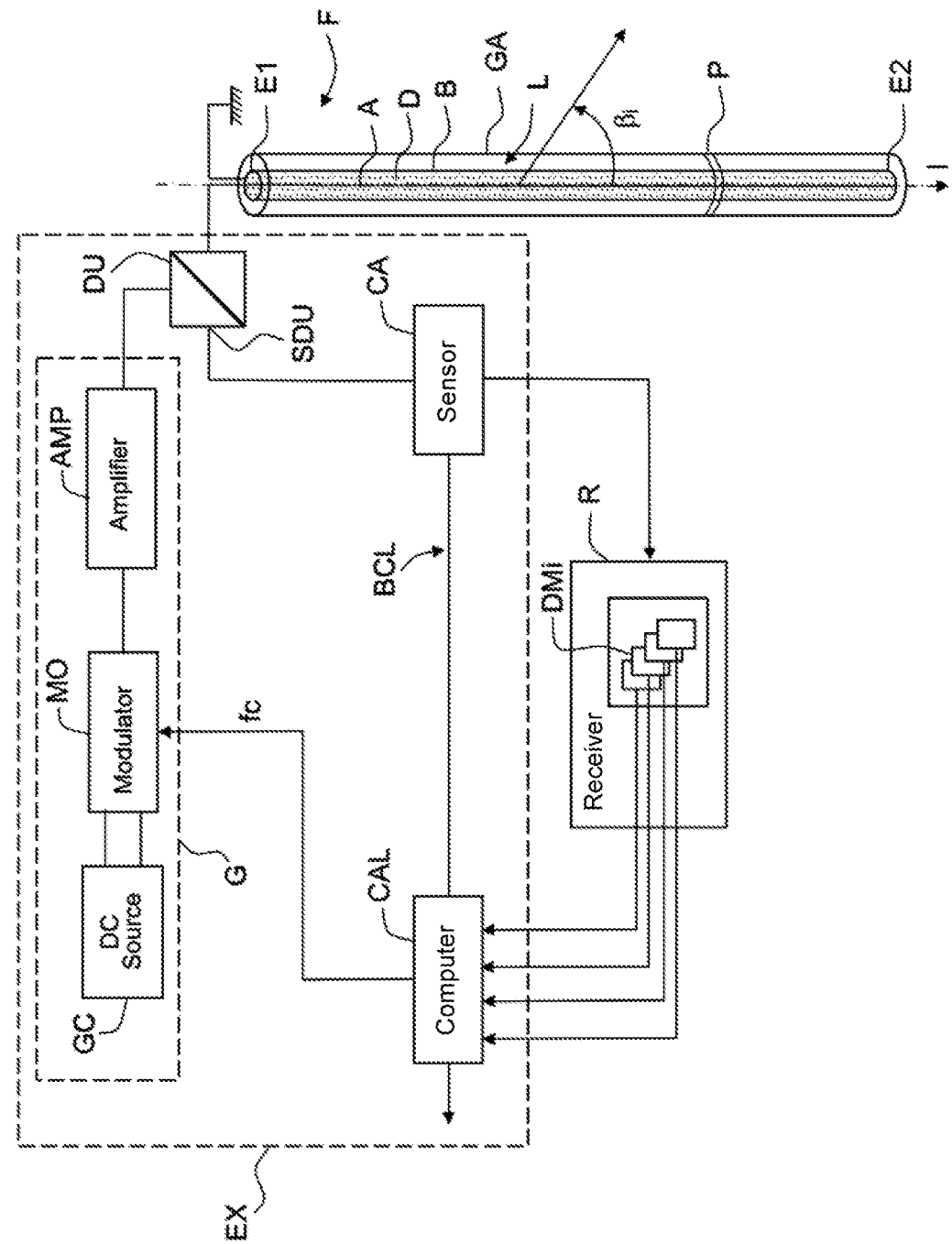

FIG. 2 shows the elements of a device for receiving acoustic waves comprising a towed array F comprising an acoustic antenna according to a first embodiment of the invention.

The acoustic antenna according to the invention comprises an elongate line L capable of being laid out linearly.

Advantageously, the line L is flexible so as to be able to be wound around a winch T. As a variant, the line L is linear.

According to the invention, the acoustic antenna is configured to be able to function as a condenser microphone distributed along the line L.

A condenser microphone conventionally comprises a capacitor comprising two conductive plates separated by a distance representative of the acoustic pressure applied to the capacitor. A variation in this acoustic pressure leads to a variation in the voltage V applied across the two plates of the capacitor.

By condenser microphone distributed along the line, what is meant is a condenser microphone the capacitance per unit length of which is sensitive locally to the pressure on a number of longitudinal segments of the line L or on each and every longitudinal segment of the line L, i.e. along the whole of the length of the line L.

Thus, a local variation in the acoustic pressure on a longitudinal segment P of the line L causes a variation in the capacitance per unit length of this capacitor which, to the first order, is proportional to the acoustic pressure applied to the capacitor $C(p)=Cr(1+kp)$. The charge per unit length Q in Coulombs of this cable is $Q=C*V$ and it cannot flow from one plate to the other due to the presence of the dielectric. The variation dC in the capacitance per unit length under the action of a variation dP in the acoustic pressure thus causes a proportional variation dV in voltage V, this being the basic principle of condenser microphones. Cr is the capacitance per unit length of the capacitor at a reference pressure.

In the first embodiment (shown in FIG. 2), the acoustic antenna is the line L and the line L is a transmission line comprising two conductors A and B that are separated by a first dielectric D and across which is applied an input voltage. The conductors A and B are the plates of a capacitor forming a condenser microphone.

In other words, the transmission line L is configured so that, under the effect of an acoustic pressure to which it is subjected locally in each longitudinal segment of the transmission line L, the voltage applied across the two conductors A and B of the transmission line L in the longitudinal segment is modulated. The transmission line L functions as a condenser microphone over the whole length of the transmission line L. This embodiment uses the parasitic microphone effect induced on the transmission line by the acoustic wave, and which it is usually sought to minimize, to characterize acoustic waves.

In the non-limiting example of FIG. 2, the transmission line L is a coaxial cable comprising a core A, which is the first conductor. The core A is encircled by a first dielectric D itself encircled by shielding B forming the second conductor.

The device of FIG. 2 comprises a towed array F comprising the transmission line L and a protective sheath encircling the transmission line L.

The array F for example takes the form of an elongate element extending the length of the line L and capable of being laid out linearly as shown in FIGS. 1 and 2.

Advantageously, the array F is flexible so as to be able to be wound around a winch T. As a variant, the array F is linear.

The transmission line L extends longitudinally from a first longitudinal end E1 to a second longitudinal end E2.

Other embodiments of the transmission line L are of course envisionable. The transmission line may, for example, take the form of a twisted pair included in the first dielectric, of a twin-lead line included in the first dielectric or of a flat cable comprising two conductive ribbons separated by the first dielectric.

As a variant, the line is not a transmission line. The line for example comprises a first conductor joined to the first dielectric, and the line is configured to function as a transmission line when the first dielectric makes direct physical contact with a second conductor, sea water for example. The line for example consists of a conductive core encircled by the first dielectric. A conductive medium in which it is submerged then plays a shielding role and therefore the role of the second plate of the capacitor. The input voltage is then applied across the first conductor and the second conductor.

The first dielectric is, for example, compressible. In other words, it is chosen so that its thickness varies locally under the effect of a variation in the acoustic pressure applied locally to the transmission line, this having the effect of making the distance between the two plates of the capacitor vary locally and therefore of making the capacitance per unit length of the capacitor vary locally. The thickness of the first dielectric (compression or depression) modulates locally the voltage applied across the plates of the capacitor.

As a variant, the first dielectric is chosen so that its permittivity varies locally when the acoustic pressure applied locally to the transmission line varies, this having the effect of making the capacitance per unit length of the capacitor vary locally and therefore of making the local modulation of the voltage applied across the plates of the capacitor vary locally.

These examples are non-limiting. It is possible to envision various types of lines having a characteristic, a geometric characteristic for example, that is sensitive to acoustic pressure so as to function as a condenser microphone, i.e. so as to modulate locally a voltage to which the transmission line is subjected depending on the acoustic pressure to which it is subjected. For example, the geometry of the first dielectric is defined so as to deform under the effect of a variation in pressure so as to make the capacitance of the condenser microphone vary. It is possible, for example, to employ a herringbone geometry such that the distance between the ends of the 'bones' varies under the effect of a variation in pressure so as to cause a variation in capacitance per unit length.

As shown in FIG. 2, in addition to the acoustic receive antenna F, the device for receiving acoustic waves comprises an exciter EX configured to apply, in a receiving step, a voltage across the two electrodes A and B of the transmission line L, at the first longitudinal end E1 of the transmission line L, so as to generate an input electromagnetic wave that travels to the second longitudinal end E2 of the transmission line L, and that is reflected from the second longitudinal end E2 (left unmatched) of the transmission line so as to form an output electromagnetic wave moving in the opposite direction to the input electromagnetic wave.

According to the invention, the exciter EX is configured to apply, simultaneously, in the acoustic-antenna receiving phase, to the first end of the line L1, across the first conductor A and the second conductor B, a voltage comprising a set of sinusoidal voltages comprising a fundamental sinusoidal voltage and a set of harmonics of the fundamental sinusoidal voltage.

Moreover, according to the invention, the frequency of the fundamental voltage is defined so that stationary waves are established in the transmission line L. The frequency f of the fundamental sinusoidal voltage is then the resonance frequency of order 1 of the transmission line. The condenser microphone (or the line) is used as an electromagnetic resonator. Thus, the output electromagnetic wave comprises directional acoustic-antenna channels.

The continuous line condenser microphone formed by the transmission line L of FIG. 2 globally amplitude modulates each stationary wave generated by one of the harmonic voltages of the excitation signal. Since the transfer function of the transmission line L is linear, the harmonics do not interfere with one another. The acoustic signal is the modulating signal. Therefore, it is enough to separate or to select the various amplitude-modulated carriers (stationary waves) and to amplitude demodulate them, to obtain the acoustic signal or modulating signal.

This modulation of each harmonic stationary wave by the acoustic signal is everywhere proportional to the effective voltage of the stationary wave generated by the harmonic in question.

One major advantage of this solution lies in the fact that excitation by harmonic stationary waves naturally forms directive channels directed in various directions. The solution is therefore suitable for application to detecting and locating objects. Furthermore, the processing needed to obtain these various channels is particularly easy. Simply separating or selecting carrier frequencies and performing amplitude demodulation allows these channels to be accessed. This processing is inexpensive in terms of computing power. It may be performed using a simple multichannel radio demodulator such as, for example, a software defined radio (SDR) or an analog radio.

Specifically, an input signal (or input voltage across the two plates A and B) is applied to the first end E1, i.e. to the input, of the transmission line, this signal (or voltage) having the following form:

$$UE(t) = \sum_{i=0}^{N} Ui * \cos(i * \omega * t + \varphi_i)$$

where Ui is the peak voltage of the harmonic of order i, where N−2 is the number of harmonics of the fundamental voltage when Ui is non-zero for each i higher than or equal to 1 and where ω is the angular frequency of the fundamental sinusoidal voltage corresponding to the resonance of the transmission line such that:

$$\omega = 2*\pi*\frac{c0}{L0} \text{ and } f = \frac{\omega}{2\pi} = \frac{L0}{c0}$$

where f is the frequency of the fundamental voltage (called the fundamental frequency in the rest of the text), c0 is the speed of propagation of the electromagnetic wave through the cable and L0 is the length of the transmission line L.

In one particular embodiment Ui is zero when i=0. In this case, only sinusoidal voltages are input into the transmission line L.

As a variant, Ui is non-zero when i=0. A DC voltage (harmonic of order 0) is applied to the input of the transmission line L, in addition to the sinusoidal voltages and at the same time as the sinusoidal voltages.

On generating stationary waves in the transmission line L, each stationary wave of order i resulting from a sinusoid of order i linearly modulates the sensitivity of the transmission line L along the transmission line L, with a spatial period $L_i$ given by:

$$L_i = \lambda_i / 2$$

where $$\lambda_i = c0/f_i$$

$$\omega_i = i*\omega = 2*\pi*f_i = 2*\pi*f*i$$

and where $f_i$ is the frequency of the sinusoidal wave i and $\lambda_i$ is its wavelength. $f_1$ is equal to f.

The transmission line then becomes a directional condenser microphone privileging reception in a lobe that is axisymmetric about the axis I of the transmission line and the aperture of which depends on the wavelength of the harmonic and on the acoustic wavelength.

The privileged direction is the direction in which the projection of the acoustic signal onto the transmission line L has the same wavelength as the stationary wave $\lambda_i$, i.e. the same spatial period as the stationary wave of order i. Each amplitude-modulated sinusoid of order i thus forms a channel in a privileged direction making an angle βi to the axis I for one particular acoustic frequency, similarly to a diffraction grating.

Thus, exciting the transmission line L with an input signal having a DC voltage in addition to the sinusoidal voltages makes it possible to obtain a channel in a direction making an angle $\beta_0 = \pi/2$ to the transmission line when it is laid out linearly.

One advantage of exciting the transmission line L with sinusoidal waves that excite the whole length of the transmission line and not just the length of a pulse is to provide an antenna having a sensitivity improved by the ratio between the length of the cable and the length of the pulse.

Another advantage of this excitation with sinusoidal waves is that flow noise is decreased, this being particularly important in the first embodiment in which the transmission line functions as a continuous condenser microphone, because of the principle of the non-localized measurement.

This type of excitation makes it possible to limit energy losses by allowing, for a given power, the peak voltage of the sinusoidal voltages input into the transmission line L to be limited. This solution is therefore perfectly suitable for submarine-warfare applications, in particular when arrays towed by underwater vehicles, such as underwater gliders or small autonomous underwater vehicles (AUVs), or unmanned surface vehicles (USVs) of low tonnage and having limited energy storage, are employed. It is particularly suitable for systems in which a high number of towed arrays must be deployed (fixed-station surveillance of land or sea borders, buoy barriers, shoals of underwater autonomous vehicles).

Moreover, this solution consumes little power, injection of a small amount of power into the transmission line being enough to maintain the stationary waves, only the ohmic and dielectric losses of the transmission line needing to be compensated for to obtain the microphone effect. It also helps to make it possible to avoid the need to provide a load for dissipating energy at the second end E2.

The acoustic device of FIG. 2 will now be described in more detail.

In order to excite the transmission line L, the exciter EX comprises a generator G configured to deliver the sinusoidal voltages and the optional DC voltage.

The generator G comprises a DC voltage generator GC configured to deliver the DC voltage.

The generator G also comprises a modulator MO, configured to deliver sinusoidal voltages and the optional DC voltage from the DC voltage.

The generator advantageously comprises a power amplifier AMP configured to amplify, for example individually, the sinusoidal voltages and the optional DC voltage.

In order to generate stationary waves, the exciter EX advantageously comprises a regulating loop BCL configured to adjust the setpoint fundamental frequency fc and therefore the fundamental frequency f depending on a standing wave ratio (SWR) so that the wave generated within the transmission line L is stationary.

To this end, the exciter EX comprises, for example, a sensor CA, for example a voltmeter intended to deliver a voltage measurement allowing a computer CAL of the exciter EX to determine a standing wave ratio, or an SWR meter intended to measure an SWR within the transmission line L. The computer CAL is advantageously configured to adjust the setpoint fundamental frequency fc based on measurements delivered by the sensor CA so that a stationary wave is generated within the transmission line L.

Advantageously, the computer CAL is configured to adjust the setpoint fundamental frequency fc based on measurements delivered by the sensor CA so that the measured SWR is maximized.

The computer CAL delivers the setpoint fundamental frequency fc. The generator G is connected to the computer CAL so as to receive the setpoint fundamental frequency fc and to deliver the fundamental voltage at a fundamental frequency f equal to the setpoint fundamental voltage fc and the harmonics of the fundamental voltage.

More particularly, the modulator receives the setpoint fundamental frequency fc.

Advantageously, the second end E2 of the transmission line L is free. In other words, the acoustic antenna F has no load connected to the second end E2 of the transmission line L. This allows stationary waves to be generated with no processing other than adjustment of the fundamental frequency, with a minimum loss and a maximum useful length with respect to a shorted end (the sensitivity of which would be zero for all the harmonics).

Advantageously, the exciter EX comprises a duplexer DU electrically connected to the transmission line L and through which the generator G is intended to apply the input voltage.

The function of the duplexer DU is to separate the input electromagnetic wave (injection) from the output electromagnetic wave (return). It includes an output SDU via which the output electromagnetic wave is intended to be transmitted to a receiver R connected to the output SDU.

The device for receiving acoustic waves comprises a receiver R that receives the output electromagnetic wave. The output electromagnetic wave comprises an optional DC voltage (when a DC voltage is input) and the amplitude-modulated sinusoidal input voltages corresponding to the antenna channels formed in various directions.

The receiver R is a multichannel radio receiver able to separate the various amplitude-modulated carriers, this making it possible to separate the various directive antenna channels each corresponding to one sinusoidal harmonic amplitude modulated by the acoustic signal when stationary waves are established in the transmission line. The various carriers are, for example, separated by Fourier transform.

The device for receiving acoustic waves advantageously comprises amplitude demodulators DMi (i=0 to N) each allowing one of the directive antenna channels to be amplitude demodulated to obtain the acoustic signal measured via each of the antenna channels. The amplitude demodulation is, for example, single-sideband or SSB demodulation, or, more conventionally, for example, conventional AM demodulation.

Advantageously, the receiver R is a software defined radio SDR. The demodulators DMi are then comprised in the receiver. As a variant, the device comprises a radio receiver allowing the various directional channels to be separated, and demodulators for amplitude demodulating the directional channels.

In the first embodiment, which is shown in FIG. 2, the acoustic antenna is the transmission line L. Moreover, the transmission line functions as a condenser microphone over the whole length of the transmission line.

This embodiment requires no hydrophone, this making it possible to produce very simple, uniform acoustic antennas of constant diameter, this facilitating their integration and their miniaturization. The length and the diameter of the antenna may be chosen arbitrarily: they are not constrained by the presence of any hydrophones, this in particular allowing the drag of the antenna and energy consumption to be limited. An antenna design having a constant diameter over its entire length is easier to wind onto a winch and makes it easier to design the winch and the winding mechanism where appropriate. Such a design also limits the risk of the acoustic antenna becoming jammed in a small space as a result of protruding hydrophones.

As a variant, the antenna may have a diameter that varies along the line.

Figure 3:
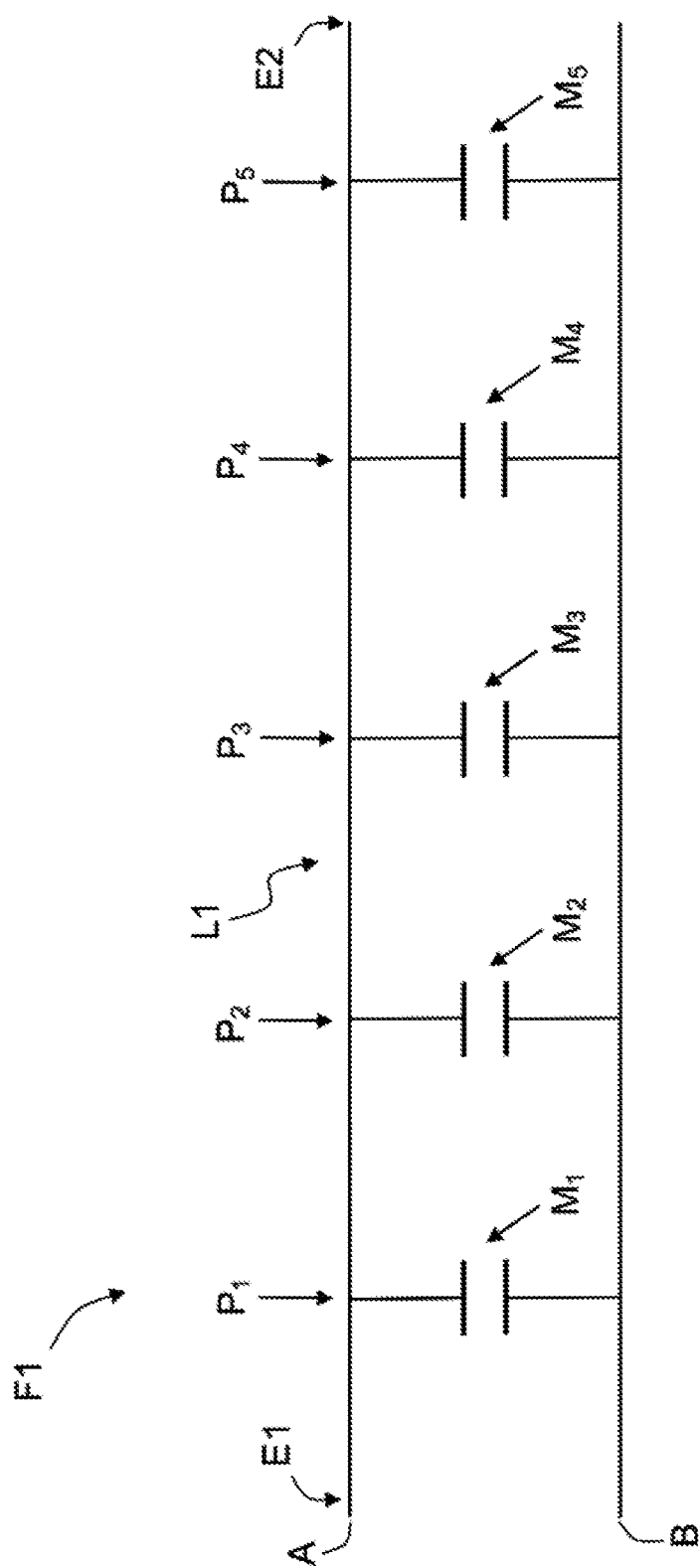
FIG. 3 shows an equivalent circuit diagram of an acoustic antenna according to a second embodiment of the invention.

FIG. 3 shows an equivalent circuit diagram of an acoustic antenna F1 according to a second embodiment of the invention.

This embodiment of the antenna differs from that of FIG. 2 in that the acoustic antenna is configured so as to be able to function as a condenser microphone substantially only in elementary longitudinal segments $P_j$ of the line L1 that are distant from one another along the line L1.

The invention also relates to an acoustic receiving device that differs from the one of FIG. 2 in that the acoustic antenna is such as shown in FIG. 3.

In the embodiment of FIG. 3, the acoustic antenna comprises the line L1 and elementary condenser microphones $M_j$, with j=1 to J (J=5 in the non-limiting example of FIG. 3), placed in longitudinal segments $P_j$ of the line L1 that are distant from one another along the transmission line L1, and that are connected to the line L1 in the respective longitudinal segments.

The condenser microphones $M_j$ are connected in parallel.

In the particular example of FIG. 3, the line L1 is a transmission line comprising the first conductor A and the second conductor B, the first conductor A and the second conductor B being separated by a second dielectric.

Advantageously, the transmission line L1 is insensitive to a variation in acoustic pressure or the sensitivity of the transmission line to a variation in acoustic pressure is negligible compared to that of the elementary condenser microphones. For example, the second dielectric is insensitive to variations in acoustic pressure. The second dielectric is, for example, incompressible or has a local permittivity that is independent of local pressure variations.

The transmission line L1 may be coaxial. Other embodiments of the transmission line L1 are of course envisionable. The transmission line may, for example, take the form of a twisted pair included in the second dielectric, of a twin-lead line included in the second dielectric or of a flat cable comprising two conductive ribbons separated by the second dielectric.

Each elementary condenser microphone $M_j$ comprises a first plate lying in the longitudinal segment $P_j$ in question and connected to the first conductor A of the transmission line L1 in the section in question, and a second plate lying in the longitudinal segment $P_j$ in question and connected to the second conductor B of the transmission line L1 in the longitudinal segment $P_j$ in question.

Therefore, all the elementary condenser microphones $M_j$ globally amplitude modulate each stationary wave generated by one of the harmonic voltages of the excitation signal.

The modulation of each harmonic stationary wave by the acoustic signal is the sum of the local modulations of the stationary wave in question by each of the elementary condenser microphones.

The second embodiment has substantially the same advantages as that of FIG. 2.

Moreover, it allows an array or acoustic antenna having a better sensitivity than the embodiment of FIG. 2 to be obtained insofar as it is easier to produce elementary condenser microphones, i.e. substantially point-like condenser microphones, having a good sensitivity than it is to produce a transmission line having a good sensitivity.

However, this embodiment requires more hardware and is less simple to assemble than the first embodiment. Moreover, it is less advantageous from the point of view of the diameter of the acoustic antenna.

Advantageously, in the second embodiment, the elementary condenser microphones $M_j$ are distributed, along the transmission line L1, logarithmically or randomly in order to allow parsimonious sampling of the output electromagnetic wave and therefore compressed acquisition. This type of distribution makes it possible to reconstruct the various amplitude-modulated sinusoids from the signals measured at the output of the duplexer with a limited number of condenser microphones.

As a variant, the condenser microphone comprises a number of elementary condenser microphones higher than or equal to twice the fundamental resonance frequency f of the line L1 and the elementary condenser microphones are distributed along the transmission line in order to allow the various amplitude-modulated sinusoids to be reconstructed from the signals measured at the output of the duplexer with a limited number of condenser microphones. This solution has the advantage of not requiring assumptions to be made about the acoustic signals to be measured (spectrum) to sample the signals measured at the output of the duplexer.

This embodiment may of course be implemented with a transmission line L1 or with a line configured to have a transmission function when its second dielectric is brought into direct physical contact with another conductor just like the first embodiment.

The device for receiving acoustic waves according to the invention advantageously comprises a processing device configured to detect and/or locate underwater targets based on the frequency- and amplitude-demodulated output wave.

This processing is, for example, carried out by the computer CAL or another computer.

The proposed solution has the advantage of allowing the data acquisition for the whole acoustic antenna to be centralized in a single component, the receiver, this eliminating any problems with differential phase and relative level calibration while simplifying processing by the user and the associated cost.

The invention also relates to a method for detecting acoustic waves employing a receiving device according to the invention. This method comprises a receiving step in which the exciter applies, to the first longitudinal end E1 of the line, an input voltage that simultaneously comprises a set of sinusoidal voltages comprising a fundamental sinusoidal voltage and a set of harmonics of the fundamental sinusoidal voltage.

The invention also relates to a method for forming directional acoustic channels comprising the method for detecting acoustic waves according to the invention and the following steps: separating the output electromagnetic wave from the input electromagnetic wave, frequency demodulating the output electromagnetic wave so as to separate various antenna channels and to amplitude demodulate the antenna channels.

The invention claimed is:

1. A device for receiving acoustic waves, comprising:
    an acoustic antenna comprising a conductor (A), a dielectric (D), and a line (L), the line (L) being a transmission line or being configured to function as a transmission line when the dielectric makes direct physical contact with another conductor,
    an exciter (EX) configured to apply, in a receiving step, an input voltage to a first longitudinal end (E1) of the line (L) so as to generate an input electromagnetic wave that moves toward a second longitudinal end (E2) of the line (L) and so as to generate an output electromagnetic wave that moves in the opposite direction to the input electromagnetic wave, the input voltage simultaneously comprising a set of sinusoidal voltages comprising a fundamental sinusoidal voltage and a set of harmonics of the fundamental sinusoidal voltage, the frequency of the fundamental sinusoidal voltage being defined so that stationary waves are established in the line (L) such that the output electromagnetic wave comprises directional acoustic-antenna channels, and wherein the acoustic antenna is able to function as a condenser microphone distributed along the line (L) of the acoustic antenna.

2. The device for receiving acoustic waves as claimed in claim 1, comprising a receiver (R) allowing the directional acoustic-antenna channels to be separated and a set of demodulators (DMi) allowing the directional antenna channels to be amplitude demodulated.

3. The device for receiving acoustic waves as claimed in claim 1, wherein the line (L) is a transmission line.

4. The device for receiving acoustic waves as claimed in claim 1, wherein the line (L) is able to function as a condenser microphone over the whole of its length.

5. The receiving device as claimed in claim 1, wherein the acoustic antenna comprises elementary condenser microphones that are spaced apart along the line and electrically connected to the line so that the antenna is able to function as a condenser microphone in longitudinal segments that are spaced apart from one another along the line.

6. The device for receiving acoustic waves as claimed in claim 1, comprising a duplexer (DU) configured to separate the output electromagnetic wave from the input electromagnetic wave.

7. A method for detecting acoustic waves using a device for receiving acoustic waves as claimed in claim 1, the detecting method comprising a receiving phase in which the exciter (EX) applies, to the first longitudinal end (E1) of the transmission line (L), the input voltage.

8. A method for forming directional acoustic channels comprising the method as claimed in claim 7, the method further comprising the following steps: separating the output electromagnetic wave from the input electromagnetic wave, separating the directional acoustic-antenna channels and amplitude demodulating the directional channels.

* * * * *